United States Patent [19]
Elvekjaer et al.

[11] Patent Number: 5,465,482
[45] Date of Patent: Nov. 14, 1995

[54] METHOD FOR MATCHING THE FLOW CAPACITY OF A RADIAL TURBINE OF A TURBOCHARGER TO A CAPACITY OF AN INTERNAL COMBUSTION ENGINE

[75] Inventors: Peter Elvekjaer, Baden; Urs Gribi, Oberrohrdorf, both of Switzerland

[73] Assignee: ABB Management AG, Baden, Switzerland

[21] Appl. No.: 258,995

[22] Filed: Jun. 13, 1994

[30] Foreign Application Priority Data

Sep. 3, 1993 [EP] European Pat. Off. .............. 93114120

[51] Int. Cl.$^6$ .................................................. B23P 15/00
[52] U.S. Cl. ...................... 29/889.1; 29/889.23; 29/401.1
[58] Field of Search .............................. 29/889.23, 889.1, 29/401.1; 60/330; 416/180, 197 C

[56] References Cited

U.S. PATENT DOCUMENTS

| | | |
|---|---|---|
| 4,184,812 | 1/1980 | Nomura et al. . |
| 4,936,002 | 6/1990 | Silvestri, Jr. et al. ................. 29/889.1 |
| 5,113,654 | 5/1992 | Sahashi ................................. 29/889.23 |
| 5,246,335 | 9/1993 | Mitsubori et al. . |
| 5,267,397 | 12/1993 | Wilcox ................................... 29/889.1 |

FOREIGN PATENT DOCUMENTS

| | | |
|---|---|---|
| 2197420 | 3/1974 | France . |
| 1315307 | 5/1973 | United Kingdom . |

*Primary Examiner*—Irene Cuda
*Attorney, Agent, or Firm*—Burns, Doane, Swecker & Mathis

[57] ABSTRACT

A method for matching the radial turbines of turbochargers, to the respective internal combustion engine, includes managing with a relatively small expenditure of material and labor time and with low costs. In accordance with the method this is achieved by modifying exclusively gas outlet end components of the radial turbine (1). For this purpose, the vanes (5) of the rotor (6) are first shortened and the flow duct (7) between the hub (8) of the rotor (6) and the gas outlet flange (9) is then correspondingly narrowed. This takes place by the insertion of a different, correspondingly enlarged gas outlet flange (9). For this purpose, the gas outlet flange (9) is fastened to the gas inlet casing (2) so that it is easily releasable.

2 Claims, 1 Drawing Sheet

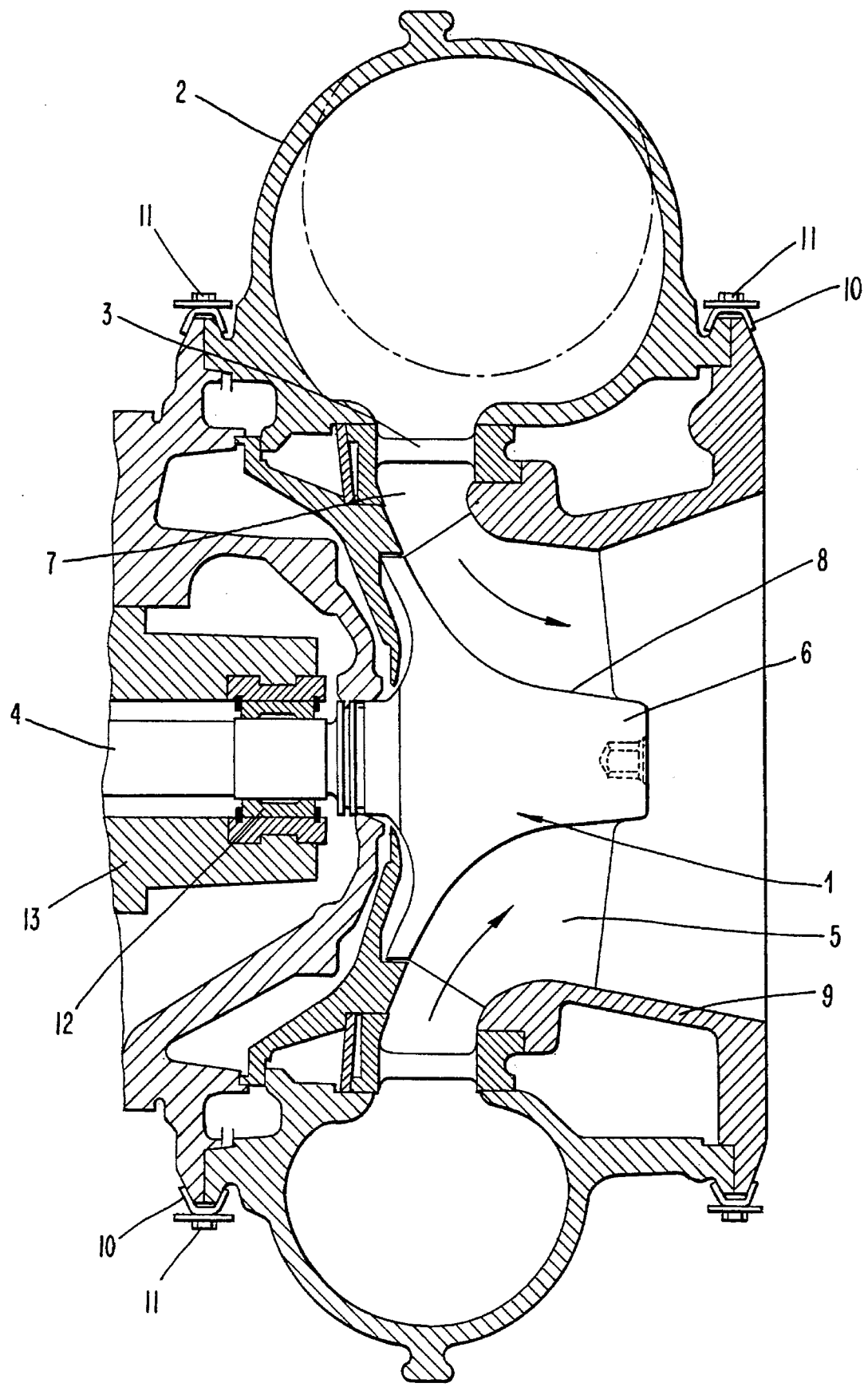

METHOD FOR MATCHING THE FLOW CAPACITY OF A RADIAL TURBINE OF A TURBOCHARGER TO A CAPACITY OF AN INTERNAL COMBUSTION ENGINE

BACKGROUND OF THE INVENTION

1. Field of the Invention

The invention relates to a method and an apparatus for matching the flow capacity of a radial turbine of a turbocharger to a flow capacity of an internal combustion engine.

2. Discussion of Background

Radial turbines for turbochargers typically include at the gas inlet end, of a spiral-shaped gas inlet casing and a nozzle ring spatially terminating this casing in the direction toward the gas outlet end. The rotor, which is guided on the compressor drive shaft and is provided with vanes, is arranged at the gas outlet end. The gas flow duct extends between the rotor hub and the opposite region of the gas outlet casing. Instead of a gas outlet casing, it is also known to use a gas outlet flange which is releasably connected to the gas inlet casing by a plurality of bolts uniformly distributed on its periphery.

If a turbocharger is to be associated with a certain internal combustion engine, the swallowing capacity of the radial turbine, i.e. the size of the delivery flow processed by it for a given machine diameter, has to be correspondingly matched.

For this purpose, a method is known in which the rotor vanes and the nozzle ring vanes are first shortened by removal of material from the vane height to correspond with the parameters of the internal combustion engine. As an alternative to this and—if required—additionally also, the angle of incidence of the nozzle ring vanes can or must be modified, i.e. different nozzle rings with the required vane angle of incidence are employed. Because the gas inlet casing and the nozzle ring are accurately matched to one another, the gas inlet casing must subsequently be correspondingly matched, i.e. it must also be exchanged.

In this method, the matching of the radial turbine to correspond with the modified rotor takes place at the gas inlet end, i.e. both the nozzle ring and the spiral-shaped gas inlet casing must be exchanged. For this reason, the method is very expensive in terms of labor and is therefore costly. Because of the many combination possibilities, this requires quite a high stores holding of the corresponding exchange parts and very extensive transport requirements for the matching of the turbocharger to the corresponding internal combustion engine (which takes place on site). This further increases the costs.

In special cases where a turbocharger is matched to an internal combustion engine, such as in emergency electricity generating units, where a rapidly responding turbocharger is required, the mass moment of inertia of the rotor is reduced by employing an appropriate rotor in a lower mass material, for example, ceramic. These known rotors, however, are very expensive and, furthermore, do not have sufficient functional reliability.

SUMMARY OF THE INVENTION

Accordingly, one object of the invention is to avoid all these disadvantages and to provide a novel method and apparatus for matching the flow capacities of radial turbines of turbochargers to the flow capacity of a particular internal combustion engine, the method and apparatus managing with a relatively small expenditure of material and labor time and with low costs.

In accordance with the invention, this is achieved by modifying exclusively gas outlet end components of the radial turbine. This takes place in a particularly advantageous manner if the rotor vanes are first shortened and the flow duct between the hub of the rotor and the gas outlet flange is then correspondingly narrowed.

In a further embodiment of the invention, a smaller rotor is first inserted in order to match the radial turbine of a turbocharger to the internal combustion engine and the flow duct between the rotor hub and the gas outlet flange is then correspondingly narrowed.

Because the matching to the modified external contour of the rotor takes place at the gas outlet end, the advantages of the invention are to be found, inter alia, in the disappearance of the previously necessary exchange of the mutually matched gas inlet end components, i.e. the gas inlet casing and the nozzle ring. In this way, it is possible to economize with regard to both the requirements and the costs of the dismantling and assembly, storage and transport of these parts and the additional machining of the nozzle ring.

It is particularly expedient to replace the existing gas outlet flange by a different gas outlet flange enlarged to correspond with the shortened rotor vanes in order to narrow the flow duct. In accordance with the invention, therefore, it is only necessary to store, transport and match one additional component, which is of substantially smaller dimensions.

In order to ensure rapid dismantling and assembly, a further advantage is provided if the gas outlet flange is fastened to the gas inlet casing in an easily releasable manner. For this purpose, it is held there by means of a clamping strip and at least one bolt arranged in the peripheral direction.

Finally, the nozzle ring is advantageously arranged between the gas inlet casing and the gas outlet flange in a positive and easily releasable manner. In consequence, it can be likewise relatively easily exchanged if required. This takes place by first releasing and removing the gas outlet flange from the gas inlet casing by means of the bolt and clamping strip. The nozzle ring can then be withdrawn from the plug-in connection in the gas inlet casing and replaced by a different one. The assembly takes place in the reverse order. This additional advantage of relatively easy and rapid exchangeability of the nozzle ring, if required, is only made possible by means of the easily releasable fastening, according to the invention, of the gas outlet flange on the gas inlet casing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein the single figure shows an embodiment example of the invention using a radial turbine.

DESCRIPTION OF THE PREFERRED EMBODIMENTS

Referring now to the drawing, the figure shows a longitudinal section through the radial turbine, the gas outlet end components in the lower half being shown to correspond with the initial condition and those in the upper half being shown modified according to the invention.

Only the elements essential to understanding the invention are shown. Parts of the installation not shown are, for example, the compressor components of the turbocharger and its fastening to the chimney. The flow direction of the working medium is indicated by arrows.

The radial turbine 1 consists, at the gas inlet end, of a spiral-shaped gas inlet casing 2 which is terminated spatially by a nozzle ring 3. A rotor 6 provided with vanes 5 is arranged on the compressor drive shaft 4 at the gas outlet end. The flow duct 7 for the gas is formed by the hub 8 of the rotor 6 and the gas outlet flange 9, which is in turn fastened onto the gas inlet casing 2 by means of a clamping strip 10 and a bolt 11 arranged in the peripheral direction. The compressor drive shaft 4 is supported by means of bearings 12 in the housing 13. The nozzle ring 3 is arranged between the gas inlet casing 2 and the gas outlet flange 9 in a positive and easily releasable manner.

In order to match the flow capacity of a radial turbine 1 to an internal combustion engine, the flow duct 7 is correspondingly narrowed after the vanes 5 of the rotor 6 have been shortened. This is done by installing a gas outlet flange 9 matched to the shortened vanes 5, i.e. one which is of larger configuration. This exchange can take place particularly rapidly because of the easily releasable fastening of the gas outlet flange 9 onto the gas inlet casing 2 by means of the clamping strip 10 and the bolt 11.

Because of the positive and easily releasable arrangement of the nozzle ring 3 between the gas inlet casing 2 and the gas outlet flange 9, this nozzle ring 3 can also be exchanged relatively rapidly, if required. For this purpose, the gas outlet flange 9 is first likewise released and removed from the gas inlet casing 2 by means of the clamping strip 10 and the bolt 11. The nozzle ring 3 can then be withdrawn from its positive connection and be replaced by a different one. Assembly takes place in the reverse order.

In a further embodiment of the invention, a smaller rotor 6 is first employed to adapt the radial turbine 1 of a turbocharger to the internal combustion engine and the flow duct 7 is then likewise correspondingly narrowed between the hub 8 of the rotor 6 and the gas outlet flange 9.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for adapting a flow capacity of a radial turbine of a turbocharger to a flow of an internal combustion engine, wherein the radial turbine comprises a gas inlet casing, a rotor having a hub and rotor blades mounted to a shaft, a gas outlet flange fastened to the gas inlet housing, means for fastening the gas outlet flange to the gas inlet casing, the hub of the rotor and the gas outlet flange defining a flow conduit having a predetermined flow capacity, and a nozzle ring disposed between the gas inlet casing and the gas outlet flange, the method comprising the steps of:

removing the gas outlet flange from the gas inlet casing;

removing the rotor from the shaft;

mounting a substitute rotor having shorter rotor blades than the removed rotor to the shaft;

fastening a substitute gas outlet flange to the gas inlet casing, the substitute gas outlet flange having contour to match the substitute rotor and define a flow conduit having a smaller flow capacity than the predetermined flow capacity.

2. The method according to claim 1, further comprising the step of shortening the rotor blades of the removed rotor to provide the substitute rotor.

\* \* \* \* \*